Dec. 31, 1968   F. L. STEEN   3,419,757
OVERCURRENT PROTECTIVE MEANS
Filed April 8, 1966

INVENTOR:
FLOYD L. STEEN,
BY Albert S. Richardson Jr.
ATTORNEY

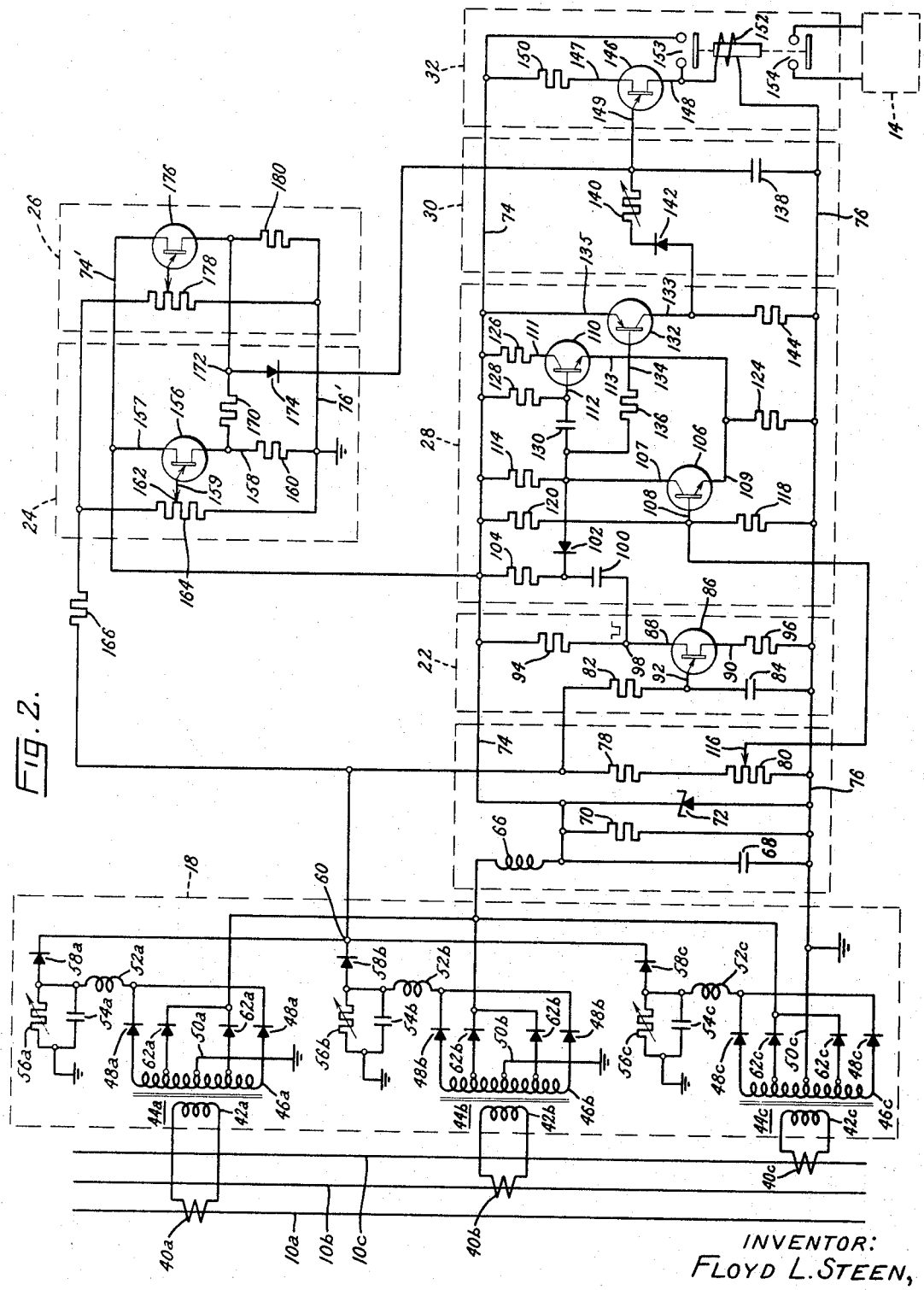

United States Patent Office 3,419,757
Patented Dec. 31, 1968

3,419,757
OVERCURRENT PROTECTIVE MEANS
Floyd L. Steen, Lansdowne, Pa., assignor to General
Electric Company, a corporation of New York
Filed Apr. 8, 1966, Ser. No. 541,278
6 Claims. (Cl. 317—36)

ABSTRACT OF THE DISCLOSURE

A static inverse-time-overcurrent protective circuit includes an integrator energized by electric pulses of constant amplitude but variable frequency and width, and a level detector connected to the integrator for operation when the cumulative periods of energization reach a predetermined sum. The source of pulses is so arranged that both their frequency and their width are modulated by overcurrent magnitude. As illustrated this source comprises a monostable multivibrator which produces a succession of fixed amplitude pulses of a duration that depends on the magnitude of overcurrent and of a frequency that corresponds to that of a relaxation oscillator which is operative at a frequency also determined by the overcurrent magnitude.

---

Figure 1:
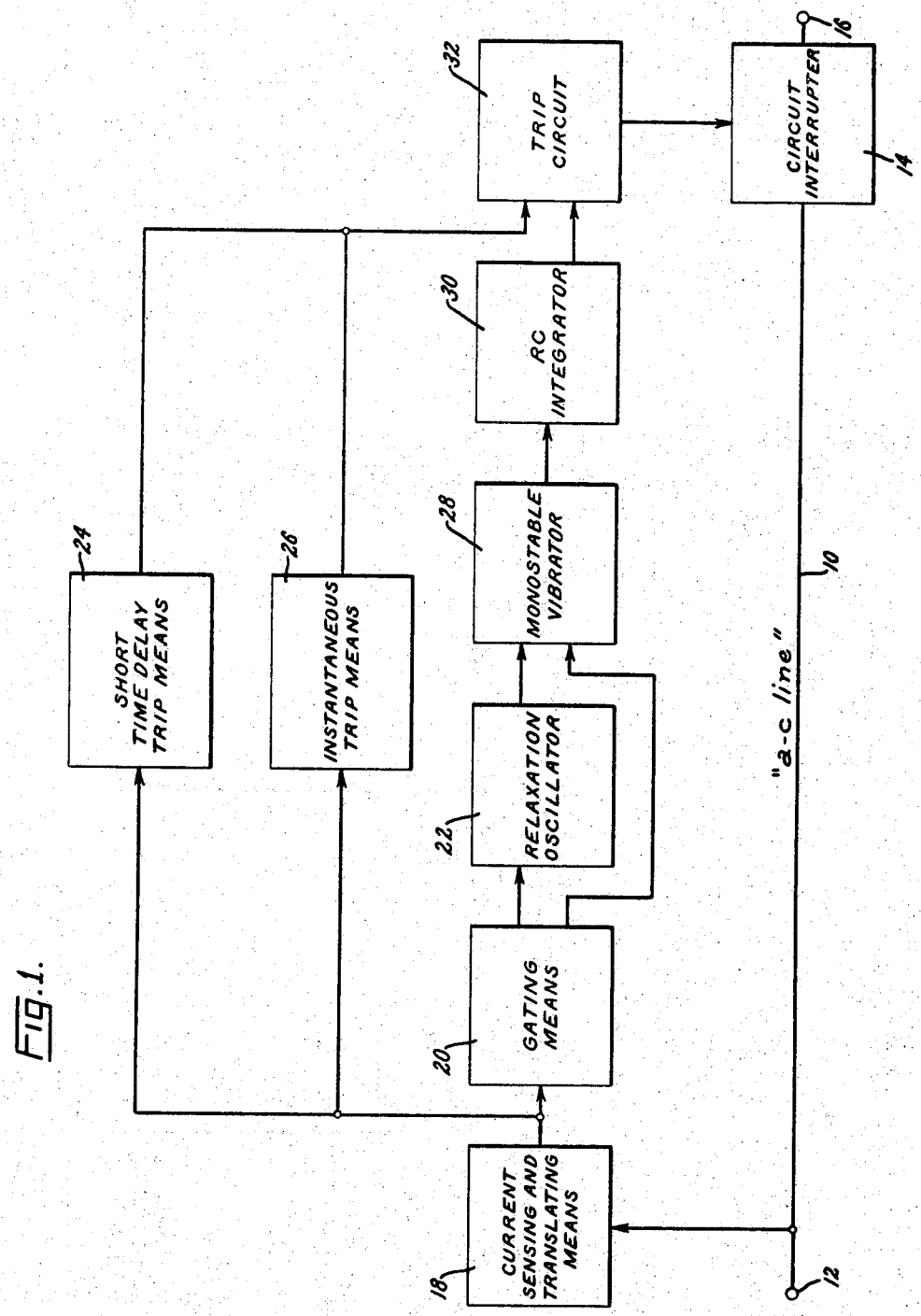

This invention relates to protective means for electric current circuits, and more particularly it relates to an improved overcurrent responsive protective device utilizing an electrical energy accumulating element, such as a capacitor, to delay operation of the device for a length of time that is inversely related to the amount of overcurrent in the protected circuit.

In the art of protecting electric lines of circuits, it is common practice to use devices such as relays designed to operate, in response to abnormal circuit conditions, with a time delay innversely related to the severity of the abnormality. For example, the overcurrent protective delay having an inverse-time-overcurrent operating characteristic is well known in the art, as is the overcurrent trip device for electric circuit breakers. In order to provide optimum circuit protection whenever an overcurrent or fault (short circuit) condition occurs, the operating characteristic of such a device should ideally approach an $I^2t$-equals-a-constant relationship, that is, the operating time ($t$) of the protective device should vary inversely in proportion to approximately the second power of the circuit current ($I$). Such an operating characteristic will match the thermal damage characteristic of the protected circuit under abnormal conditions, when the threat of damage is proportional to the square of the current value.

While inverse-time-overcurrent devices employing mechanical or electromechanical construction to obtain the requisite time delay have had a long and successful history, such prior art devices do have some recognized drawbacks. The principal ones, perhaps, are the relatively large amount of input energy required for reliable operation and inherent inertia of the movable armature or rotor of the device. Consequently, there has been a recent trend in the art to accomplish the same functional result by means of "static" circuitry, i.e., by appropriate combinations of semi-conductors and other physically small, low-power, solid-state components having no moving parts.

Typically such a static arrangement employs, in combination, electric energy storing means comprising a reactance element, such as a capacitor, and level detecting means responsive to the reactance element accumulating a predetermined critical level of energy. By suitably energizing the energy storing means in response to an overcurrent condition in the circuit whose protection is desired, the reactance element attains the aforesaid critical level of energy (and hence the level detecting means will operate) on the expiration of a time delay inversely related to the degree of overcurrent involved.

There are several different ways in which the electric energy storing means can be energized to obtain or approximate this result. One common approach, for example, has been to provide a continuous D-C energizing signal whose magnitude is a function of the amount of overcurrent in the protected circuit. Another approach has been to effect intermittent energization of the energy storing means by a constant-magnitude signal, with the number of energizing increments per unit of time being varied as a function of overcurrent magnitude. In order to obtain an $I^2t=K$ operating characteristic ($K$ is a constant), it has been necessary when using the latter approach to make the repetition rate of the intermittent energizing signal a nonlinear function of overcurrent magnitude.

A general object of the present invention is the provision of a new static time delay protective device, and a more specific object is the provision of a novel overcurrent protective device of the kind employing an intermittently energized reactance element, the device being so designed that an $I^2t=K$ operating characteristic can be closely approached without requiring a non-linear relationship between the rate of energization and the magnitude of overcurrent.

Another object of my invention is to provide improved overcurrent protective means that includes an incrementally charged capacitor energized in accordance with an electric quantity that varies with the magnitude of current in the circuit being protected.

In carrying out my invention in one form, a protective device is formed by providing, in combination, electric energy storing means and means for supplying the energy storing means with a succession of fixed-amplitude energizing pulses the duration and frequency of which are both modulated by a signal that is derived from and representative of current in the electric current circuit being protected. The device additionally includes means connected to the energy storing means for initiating a predetermined protective function when the amount of energy accumulated in that energy storing means attains a predetermined critical level indicating that an overcurrent condition has occurred in the protected circuit. With this arrangement the time required by the energy storing means to accumulate its critical amount of energy will vary as an inverse function of approximately the square of the overcurrent value. Further, means are provided for very rapidly initiating the protective function either after a few cycles if the signal representative of the current in the protected circuit exceeds a predetermined magnitude, or substantially instantaneously if a higher predetermined magnitude should be reached.

My invention will better be understood and its various objects and advantages will be more fully appreciated from the following description taken in conjunction with the accompanying drawings in which:

FIG. 1 is a schematic diagram in block form of an overcurrent protective device embodying my invention; and FIG. 2 is a detailed schematic diagram of the preferred circuitry of the components shown in block form in FIG. 1.

In FIG. 1 the electric current circuit that is subject to protection is represented by the single line 10 labeled "A-C line." This line conducts electric power between a load terminal 12 and a source terminal 16, to which it is connected by means of a circuit interrupter or switch 14. Automatic opening of switch 14 is desired in delayed response to the occurrence of any overcurrent condition in A-C line 10 or in whatever utilization apparatus or load circuit may be connected to load terminal 12. The protective means described herein accomplishes this result by sensing the overcurrent condition and then initiating an opening operation of circuit interrupter 14 after a time delay which is inversely related to the amount of overcurrent in A-C line 10. In addition, when extremely high overcurrents are sensed as a result of very severe fault conditions, the protective means is arranged to initiate opening of 14 after a fixed delay of very short duration.

The preferred form of the protective device has been illustrated functionally in FIG. 1. It comprises a combination of components including current sensing and translating means 18 coupled to A-C line 10 and suitably arranged to derive a D-C signal representative of line current. The magnitude of the derived signal varies with the value of current in the protected line. This signal serves as an input quantity for other components of the protective device which are responsive to its magnitude. As is schematically shown in FIG. 1, it is concurrently applied to gating means 20, to a short time delay means 24, and to instantaneous trip means 26.

Whenever the representative input signal exceeds a magnitude corresponding to a given normal value of line current, the gating means 20 enables proportional signals to effectively energize a relaxation oscillator 22 and a monostable multivibrator 28. In response thereto the relaxation oscillator 22 will operate to produce a periodic output signal at a frequency proportional to its input signal magnitude. This output signal is coupled to the monostable multivibrator circuit 28 which operates in response thereto to produce a plurality of energizing pulses of fixed magnitude but of variable frequency and duration. Both the frequency and the width of the latter pulses are proportional to the input signal magnitude and hence are functions of the magnitude of the sensed overcurrent in A-C line 10. These pulses are coupled to an RC integrator 30 which, when energized for sufficient length of time to accumulate a predetermined critical level of energy, then activates a trip circuit 32 to thereby automatically open the switch 14 and disconnect the load terminal 12 from source 16. The time required by the RC integrator 30 to so operate will be inversely related to approximately the second power of the overcurrent magnitude, whereby the desired $I^2t=K$ operating characteristic is obtained.

Short time delay trip means 24 and instantaneous trip means 26 provide additional overload protection. If the representative signal derived from line current exceeds a predetermined high-overcurrent magnitude, the short time delay trip 24 becomes effective within a few cycles to activate the trip circuit 32. If the signal should increase to an even higher magnitude, then instantaneous trip means 26 will produce an output signal which activates trip circuit 32 within approximately one-half cycle.

From this discussion, it can be seen that in accordance with my invention current from source terminal 16 to load terminal 12 is constantly monitored by current sensing and translating means 18. An input signal from current sensing and translating means 18 is then coupled by way of gating circuit 20 to a relaxation oscillator 22 which periodically produces a pulse to change the state of monostable multi-vibrator 28, whereby a succession of discrete pulses is applied to the RC integrator 30. Since the frequency of these pulses and their individual duration are both modulated by the input signal, which in turn is determined by the amount of overcurrent, the rate at which the integrator accumulates energy will vary with line current squared. When the cumulative period of integrator energization by successive pulses reaches a predetermined sum, which point is reached after a delay that is inversely proportional to the overcurrent heating effect, the trip circuit 32 is actuated. Operation of RC integrator 30 by means of monostable multivibrator 28 may take many seconds; however, if the overcurrent condition in the electrical circuit being protected is relatively severe, the protective function should be effected within a few cycles. To provide this type of protection, short time delay trip means 24 is designed to perform the protective function with less time delay than that provided by relaxation oscillator 22 and monostable multivibrator 28. Similarly, if the overcurrent is such that instantaneous protection is required, the input signal will reach a higher predetermined magnitude which then causes instantaneous trip means 26 to actuate the trip circuit 32 within approximately one-half cycle.

Turning now to FIG. 2 a detailed circuit diagram is presented of the preferred embodiment of the protective device shown functionally in FIG. 1. As has already been explained, this device is designed to initiate a predetermined control function such as opening switch 14 in order to disconnect a protected load circuit connected to load terminal 12 from a power source connected to source terminal 16 in delayed response to the occurrence of an abnormal circuit condition. A three-wire polyphase A-C circuit or line 10 comprising conductors 10a, 10b and 10c is shown in FIG. 2, and the protective device is energized in accordance with the characteristic circuit quantity whose value, beyond a given normal value, reflects both the occurrence and the severity of the abnormal condition to which the device responds. In the illustrated application of the protective device, this characteristic quantity is alternating current; therefore the device is adapted to be coupled to A-C lines 10 by means of suitable current sensors 40a, 40b and 40c which are designed to step down the A-C line currents in the wires 10a, 10b and 10c, respectively. Current sensors 40a, 40b and 40c are connected to the primaries 42a, 42b and 42c of a group of auxiliary transformers 44a, 44b and 44c each having a tapped secondary 46a, 46b and 46c. As the secondary circuits for the respective transformers 44a, 44b and 44c are similar, detailed discussion will be limited to that associated with transformer 44a.

Connected to the end terminals of secondary 46a are two rectifiers 48a connected in a full-wave center tapped rectifier configuration, with center tap 50a of transformer 44a grounded. Output from this full-wave center tapped rectifier is filtered by an input filter comprising choke 52a, capacitor 54a and rheostat 56a. Capacitor 54a and rheostat 56a are connected between one terminal of choke 52a and ground in a standard configuration. Output signals from the filter are coupled through an isolating diode 58a to terminal 60.

Currents in phase conductors 10b and 10c are similarly sensed and coupled to terminal 60 so that the D-C signal at terminal 60 represents the highest current in any of the thee conductors comprising the protected circuit 10. Terminal 60 serves as a connecting point for the input connection to the remainder of my protective device.

The remaining circuits in the protective device shown in FIG. 2 include solid state devices which require a bias voltage. For a self-contained unit, bias is provided by rectifiers 62a, 62b and 62c which are connected to intermediate taps on transformer secondaries 46a, 46b and 46c respectively. The rectifiers associated with each phase are connected in a full-wave configuration with the grounded center taps 50a, 50b and 50c. Smoothing of the bias voltage is accomplished by connecting these rectifiers to the input of choke 66 in a filter additionally comprising capacitor 68 and resistor 70. Bias voltage regulation is obtained by means of Zener diode 72 in a manner well-known in the art to give a positive supply power bus 74 and a grounded, negative supply power bus 76.

The signal at terminal 60 produces a voltage drop across resistor 78 in series with potentiometer 80, which voltage is impressed across resistor 82 and capacitor 84 connected in series with each other and in parallel with resistor 78 and potentiometer 80. Resistor 82 and capacitor 84 serve as an emitter bias source for a unijunction transistor 86 (hereinafter UJT) having a base-one 90, a base-two 88 and an emitter 92. The UJT 86 is biased by coupling its base 88 through a resistor 94 to the positive supply power bus 74, and base 90 is coupled to negative bus 76 by another base resistor 96. If the input signal produced at terminal 60 is sufficiently high to charge capacitor 84 to a voltage above the peak point emitter voltage for UJT 86, the UJT will then conduct and the capacitor 84 will discharge through base-one 90 and base resistor 96. The discharge will be at a frequency determined by the charging rate of capacitor 84, which, for a given set of parameters, is controlled by the input signal magnitude which, in turn, is directly proportional to the highest current magnitude in the protected line 10. If a more precise starting point is desired, suitable gating means (not shown in FIG. 2) can be provided for preventing appreciable charging of the capacitor 84 (or the integrating capacitor 138 described hereinafter) except when the input signal exceeds a predetermined pickup magnitude.

Each time capacitor 84 discharges through UJT 86, a voltage drop will occur across resistor 94 to produce a negative voltage spike at junction 98, and this voltage spike will be transferred through capacitor 100 and diode 102. Capacitor 100 is normally discharged, as both terminals thereof are connected to positive supply bus 74 through resistor 94 and resistor 104. The capacitor 100 and the diode 102 serve to couple the negative spike produced when UJT 86 discharges from the relaxation oscillator 22 to monostable multivibrator 28.

Monostable multivibrator 28 is shown as comprising a high-gain NPN transistor 106 having a collector 107, a base 108 and an emitter 109, and a companion normally conducting NPN transistor 110 having a collector 111, a base 112 and emitter 113. Collector 107 of transistor 106 is coupled to positive supply power bus 74 through resistor 114. Base 108 is connected to the slide wire 116 on potentiometer 80 and also to the junction of resistors 120 and 118 which are connected in series between positive and negative supply buses 74 and 76, whereby base 108 is biased in accordance with the signal magnitude at terminal 60. Collector 111 of transistor 110 is coupled to positive supply bus 74 by resistor 126, while emitter 113 is coupled to negative supply bus 76 by emitter resistor 124 which also couples emitter 109 of transistor 106 to the negative bus 76. Base 112 of transistor 110 is connected to positive bus 74 by resistor 128, and a capacitor 130 is connected between this base and the collector 107 of transistor 106.

Transistors 106 and 110 and their associated circuitry constitute an emitter coupled monostable multivibrator which is designed so that transistor 110 is normally on. When transistor 110 is on, transistor 106 is biased off, and the capacitor 130 assumes the steady state voltage across resistor 128, with the positive electrode of 130 being connected to collector 107. Each time a switching signal, in the form of a negative pulse from UJT 86, appears across resistor 114, the potential of the positive electrode of capacitor 130 immediately changes in a negative sense with respect to positive bus 74. Since capacitor 130 cannot discharge immediately, the voltage at base 112 of transistor 110 is also driven negatively, thereby reducing conduction through this transistor and lowering the voltage drop across the common emitter resistor 124. As the voltage across common emitter resistor 124 is reduced, emitter 109 is also taken to a more negative voltage than the voltage applied to its base so that transistor 106 begins to conduct.

While the high-gain transistor 106 is conducting, the potential at emitters 109 and 113 is maintained at a level only slightly below the bias voltage applied to base 108, which voltage depends on the magnitude of the tapped portion of the input signal at slider 116. The current in collector 107 is similarly proportional to the bias voltage at base 108, and consequently the potential to which the base 112 of transistor 110 is initially driven also depends on the input signal magnitude. With the transistor 110 now biased off, capacitor 130 begins to discharge through a path including resistor 128. As a result the voltage on base 112 rises at a substantially constant linear rate until it eventually reaches a sufficiently positive level with respect to emitter 113 to forward bias transistor 110. When transistor 110 resumes conduction the voltage drop across common emitter resistor 124 quickly increases to a level where transistor 106 is turned off.

It is now apparent that the length of time that transistor 106 is in a conducting state will be proportional to the amount the capacitor 130 has to discharge in order to change the voltage of base 112 from its initial value to the level that enables transistor 110 to return to its normal on condition. Both the initial value and the turn-on level of voltage at 112 are determined by the bias voltage applied to the base 108 of transistor 106, and hence the period of 106 conduction has a known linear relationship to the magnitude of this bias voltage. The bias voltage in turn is a function of the input signal magnitude. The portion of the input signal applied to the base 108 is set by appropriately selecting the parameters of 78, 80, 116, 118, and 120 so that a direct, linear relationship is obtained between input signal variations and the duration of conduction by transistor 106.

The collector 107 of transistor 106 is coupled by way of resistor 136 to the base of a PNP transistor 132, having a collector 133, a base 134 and an emitter 135. Transistor 132 responds to conduction by transistor 106 to switch the level of voltage applied to integrating circuit 30 from a ground potential to the potential supplied by the positive bus 74. Therefore a step energizing signal whose duration is directly proportional to the magnitude of the representative input signal of terminal 60 is applied to integrating circuit 30 each time the multivibrator 28 operates.

Integrating circuit 30 basically comprises integrating capacitor 138 which is connected in series with a rheostat 140 and a diode 142. This circuit is connected in parallel with collector resistor 144 associated with transistor 132. Whenever transistor 132 conducts, a positive supply voltage pulse is applied through diode 142 to the rheostat 140 and capacitor 138 combination. The charging rate of capacitor 138 is then determined by the RC time constant of 140 and 138 and by the ratio of energized periods to non-energized periods. Each time the transistor 132 is on, an increment of charge is added to the integrating capacitor 138. The repetition rate of successive charging increments is the same as the frequency of the relaxation oscillator 22, and initially each charging increment lasts for a period of time equal to the conducting interval of the transistor 132. It is apparent therefore that the average charging current seen by the capacitor 138 will be a function of approximately the second power of the variable input signal at terminal 60. Eventually the charge accumulated by the capacitor will reach a predetermined critical level.

Capacitor 138 is coupled to the trip circuit 32 which comprises a second UJT 146 having a base-two 147, a base-one 148, and an emitter 149. UJT 146 is connected in relaxation oscillator configuration with its base-two 147 coupled to positive supply conductor 74 by resistor 150 and its base-one 148 coupled to negative supply conductor 76 by relay coil 152. In addition, emitter 149 is connected to capacitor 138. The aforesaid critical level of charge is reached by the capacitor 138 when its voltage corresponds to the peak point emitter voltage of UJT 146, at which point the capacitor discharges through UJT 146 and relay coil 152. Energization of relay coil 152 closes relay contacts 153 connected between this coil and the positive bus 74 to lock in and thereby maintain relay coil 152 in an energized state. Relay coil 152 can also have another set of contacts 154 associated therewith to initiate opening of the protected line 10 by tripping the switch 14, whereupon the supply bus 74 becomes deenergized and the protective device resets. It will be obvious to those skilled in the art that other circuits beside relay circuits as shown herein could be used, such as thyristors, without departing from the inventive concept revealed herein.

Relaxation oscillator 22 and monostable vibration 28 in combination constitute a long delay control circuit for tripping. Long delay is obtained by the constant amplitude pulses applied to the integrator 30, and the length of delay between the occurrence of an overcurrent condition and the operation of trip circuit 32 varies inversely as the square of the current magnitude. For example, if the input signal at terminal 60 is doubled, the rate of change of capacitor 84 doubles so that the number of negative output pulses appearing at terminal 98 doubles the conduction frequency of transistor 106. In addition, the voltage applied to base 108 of transistor 106 increases so that twice as long a time interval is required to discharge capacitor 130 to the level that will cause transistor 110 to resume conduction, thereby doubling each conduction period of transistor 106. However, by using transistor 132 in series between monostable multivibrator 28 and the integrator 30, the amplitude of the pulses is maintained at a constant value determined by the supply voltage regulator 72.

If it is desired at certain high overcurrent or short circuit levels in the electrical circuit to be protected to quickly disconnect load terminal 12 from power source terminal 16, one or both of the short time delay trip means 24 or instantaneous trip means 26 can be added to the protective device in FIG. 2 as shown. Both means are shown here, and they each basically consist of a unijunction transistor firing circuit which fires when the input signal at terminal 60 attains a second or third predetermined magnitude. Above the second predetermined magnitude, a short time delay trip circuit is fired and the UJT 156 stays on. More specifically, short time delay trip comprises UJT 156 having a base-two 157 connected to positive supply conductor 74', a base-one 158 connected through resistor 160 to negative supply conductor 76', and an emitter 159 connected to slide wire 162 of potentiometer 164 which is connected from negative conductor 76' to terminal 60 by resistor 166. Also connected to base 158 is resistor 170 which couples a signal at base-one 158 to output terminal 172. Slide wire 162 is adjusted so that UJT 156 is triggered when the voltage at terminal 60 reaches a second predetermined value. When this occurs, a continuous charging current is supplied to the integrating capacitor 138 and the charge time is determined by the resistor 170. Isolating diode 174 serves to conduct the charging current to capacitor 138. Resistor 170 is chosen in accordance with the requirements of the circuit and normally chosen so that the voltage on capacitor 138 will reach the peak point for activating the trip circuit 32 within a few cycles of current in the protected line 10.

A similar circuit comprising UJT 176, potentiometer 178 and resistor 180 is also used for instantaneous protection. In this case, the potentiometer 178 is adjusted so that UJT 176 is triggered when the signal at terminal 60 reaches a relatively high predetermined magnitude. When UJT 176 turns on, the full positive supply voltage appears at terminal 172 which is coupled to the integrating capacitor 138. Therefore, capacitor 138 will immediately charge to the peak point voltage so that the trip circuit 32 is activated within one-half cycle.

In this manner, the relaxation oscillator 22 and multivibrator 28 are complemented. If the amount of overcurrent is relatively small, then, an $I^2t=K$ operating characteristic is obtained. However, at higher currents when a maximum of a few cycles of overload can be tolerated, the voltage at terminal 60 reaches a second predetermined magnitude which, while firing relaxation oscillator 22 and multivibrator 28, will not cause them to trip the circuit soon enough. At this point. UJT 156 conducts and capacitor 138 is charged to the peak point firing voltage within a few cycles. Similarly, in the event of a short circuit requiring nearly instantaneous tripping, a third magnitude of voltage at terminal 60 is surpassed, and UJT 176 conducts thereby impressing a still larger voltage on capacitor 138. The time required to cause tripping as a result of signals applied by monostable multivibrator 28 can be varied by means of potentiometer 140 which controls the charging current for capacitor 138.

Briefly summarizing, the inverse time-overcurrent protective device described herein is constituted by a current sensing and translating means which, in three-phase operation, monitors the current in each phase and produces a signal which is linearly representative of the maximum current in any of the phases. This signal concurrently supplies inputs to the relaxation oscillator and to the multivibrator circuit, and the latter is arranged to generate a train of output pulses having an amplitude that is constant but having a duration and a frequency that can both vary linearly with the input signal magnitude. These output pulses are then applied to the integrating circuit in such a manner that the time required for the integrating capacitor to charge to a value which will actuate the tripping device is inversely related to the square of the input signal.

While a preferred form of my invention has been shown and described herein by way of illustration, many modifications may occur to those skilled in the art. For example, the monostable multivibrator 28 could be replaced by an alternative circuit arranged to produce periodic pulses whose widths inherently vary as their repetition rates. It is contemplated therefore by the claims that conclude this specification to cover all such modifications as fall within the true spirit and scope of the invention.

What is claimed as new and desired to be obtained by Letters Patent of the United States is:

1. A protective device comprising:
   (a) first signal producing means adapted to be coupled to an electric current circuit for deriving therefrom a signal representative of circuit current;
   (b) second signal producing means coupled to said first signal producing means for converting the signal therefrom to a succession of fixed amplitude energizing pulses the frequency and duration of which are both modulated by the signal; and
   (c) said second signal producing means having connected thereto third means energizable by said energizing pulses and operative to initiate a predetermined protective function where the cumulative periods of energization by said pulses reach a predetermined sum.

2. A protective device as recited in claim 1 wherein said second signal producing means includes a relaxation oscillator circuit connected to the first signal producing means and operative at a frequency that varies with the magnitude of the representative signal.

3. A protective device as recited in claim 2 wherein said second signal producing means additionally includes monostable multivibrator means coupled to said relaxation oscillator circuit and operative at the same frequency to produce the fixed amplitude energizing pulses having a pulse width that varies with the magnitude of the representative signal.

4. A protective device as recited in claim 1 wherein said second signal producing means comprises a relaxation oscillator coupled to said first signal producing means and a monostable multivibrator circuit coupled to both said relaxation oscillator and said first signal producing means, said oscillator being arranged to operate at a frequency determined by the magnitude of the representative signal produced by said first means and said multivibrator circuit being arranged to produce the succession of fixed amplitude energizing pulses of a frequency that corresponds to said oscillator frequency and of a duration that depends on the magnitude of said representative signal.

5. A protective device as recited in claim 1 wherein said third means includes an integrator circuit comprising a resistor and a capacitor connected in series, said resistor and capacitor being adapted to be energized by said plurality of fixed amplitude energizing pulses of varying frequency and duration and said third means being operative to initiate the predetermined protective function when the resulting charge accumulated by said capacitor reaches a predetermined level.

6. A protective device as recited in claim 5 wherein additional means is connected between said first signal producing means and said capacitor for causing relatively rapid charging of said capacitor to said predetermined level whenever said representative signal exceeds a predetermined magnitude.

References Cited

UNITED STATES PATENTS

| | | | |
|---|---|---|---|
| 3,262,017 | 7/1966 | Ashenden et al. | 317—33 |
| 3,317,794 | 5/1967 | Kotheimer | 317—36 |

JOHN F. COUCH, *Primary Examiner.*

J. D. TRAMMELL, *Assistant Examiner.*

U.S. Cl. X.R.

317—33